United States Patent
Yamamura et al.

[11] Patent Number: 5,217,662
[45] Date of Patent: Jun. 8, 1993

[54] AUTOMATIC LUBRICANT SUPPLYING METHOD AND AN APPARATUS THEREFOR

[75] Inventors: Masato Yamamura, Oshino; Nishimura Koichi, Sagamihara; Sato Takashi, Oshino, all of Japan

[73] Assignee: Fanuc Ltd., Minamitsuru, Japan

[21] Appl. No.: 684,914

[22] PCT Filed: Aug. 15, 1990

[86] PCT No.: PCT/JP90/01040
§ 371 Date: May 6, 1991
§ 102(e) Date: May 6, 1991

[87] PCT Pub. No.: WO91/02641
PCT Pub. Date: Mar. 7, 1991

[30] Foreign Application Priority Data
Aug. 22, 1989 [JP] Japan .................. 1-215511

[51] Int. Cl.⁵ .................................. B29C 45/83
[52] U.S. Cl. .................... 264/40.1; 164/149; 184/6.1; 184/7.4; 264/328.1; 425/107; 425/135; 425/589
[58] Field of Search .............. 264/40.1, 129, 130, 264/328.1, 328.11; 425/135, 138, 140, 145, 149, 150, 167, 542, 590, 107, 589, 591, 592, 593, 594, 168; 164/149; 184/6.1, 107, 7.4

[56] References Cited

U.S. PATENT DOCUMENTS

| | | | |
|---|---|---|---|
| 3,544,355 | 12/1970 | Ott | 164/149 |
| 3,767,012 | 10/1973 | Jimi et al. | 425/107 |
| 3,822,975 | 7/1974 | Hehl | 425/107 |
| 3,856,114 | 12/1974 | Zanke | 184/6.1 |
| 4,095,674 | 6/1978 | Kido et al. | 184/6.1 |
| 4,209,079 | 11/1980 | Marchal et al. | 184/6.1 |
| 4,326,603 | 4/1982 | Darrow et al. | 184/6.1 |
| 4,445,168 | 4/1984 | Petryszyn | 184/6.1 |
| 5,080,195 | 1/1992 | Mizumoto et al. | 184/6.1 |
| 5,086,877 | 2/1992 | Synatschke et al. | 184/6.1 |

FOREIGN PATENT DOCUMENTS

60-159025  8/1985  Japan .................. 264/40.1

Primary Examiner—Jay H. Woo
Assistant Examiner—K. P. Nguyen
Attorney, Agent, or Firm—Staas & Halsey

[57] ABSTRACT

A method for automatically timely supplying a lubricant to a machine working section driven by a motor and an apparatus therefor. The quantity of increase of the driving current of a mold clamping servomotor (12) during the process in which a mold clamping mechanism (10) of an injection molding machine shifts from a proper lubrication state to an improper lubrication state is previously decided for each combination of the type of the injection molding machine, injection molding conditions, and the type of grease. While a normal injection molding cycle in the proper lubrication state is being executed, a reference value for the motor driving current is decided on the basis of the normal motor driving current in a specific moved position of a movable platen (14), at which the motor current is measured for the aforesaid decision, and the increase of the motor driving current, the reference value and the specific moved position of the movable platen being loaded into a memory of a numerical control device (50). In response to a grease supply timing command, the control device drives a grease pump (40) if the detected value of the motor current in the specific moved position of the movable platen is not smaller than the reference value. Grease from the grease pump is supplied to a predetermined quantity to each of a plurality of parts of the mold clamping mechanism through a distributor (43).

9 Claims, 3 Drawing Sheets

AUTOMATIC LUBRICANT SUPPLYING METHOD AND AN APPARATUS THEREFOR

TECHNICAL FIELD

The present invention relates to an automatic lubricant supplying method and an apparatus therefor, and more particularly, to a method capable of automatically timely supplying a lubricant to a machine working section driven by means of a motor and an apparatus therefor.

BACKGROUND ART

In general, a machine having various sliding parts is smoothly operated by supplying a lubricant to these sliding parts. Visual inspection of exposed sliding parts is so easy that the lubricant can be relatively easily timely supplied to the sliding parts of this type in proper quantities in accordance with the result of the inspection. It is difficult, on the other hand, to supply a proper quantity of lubricant to those sliding parts which are not accessible to visual inspection by properly determining the timing for the supply. Conventionally, therefore, a predetermined quantity of lubricant is periodically supplied to those sliding parts inaccessible to visual inspection.

The proper lubricant supply timing varies, however, depending on the operating conditions of the machine. In some cases, therefore, the supply timing may be improper, or the quantity of lubricant supply may be excessive or insufficient, despite the periodical supply of the predetermined quantity of lubricant. If the machine is operated for a long period of time without sufficient lubricant supply, the motion of some sliding parts may lack in smoothness, so that the parts wear irregularly, possibly lowering the accuracy in structure and operation of the machine, and hence, the precision of products. If the lubricant is excessively supplied, on the other hand, there is a possibility of the lubricant leaking and entailing deterioration of those peripheral parts which are poor in resistance to lubricant.

DISCLOSURE OF THE INVENTION

The object of the present invention is to provide a method capable of automatically timely supplying a lubricant to a machine working section driven by means of a motor and an apparatus therefor.

In order to achieve the above object, according to one aspect of the present invention, there is provided an automatic lubricant is suppling method for a machine in which a lubricant is supplied to a motor-driven machine working section by means of a lubricant supplier. This method comprises the steps of: (a) detecting the value of a parameter indicative of a load acting on a moter; (b) determining whether or not the detected value of the parameter is deviated from the normal range of the motor load observed when the machine working section is properly lubricated; and (c) actuating the lubricant supplier when the detected value of the parameter is deviated from the normal range.

According to another aspect of the present invention, there is provided an automatic lubricant supplying apparatus for use in a machine having a working section driven by means of a motor. This apparatus comprises: a lubricant supplier for supplying a lubricant to the machine working section; detecting means for detecting a parameter indicative of a load acting on the motor; memory means for storing the normal range of the motor load observed when the machine working section is properly lubricated; and control means for comparing the detected parameter value and the normal range and actuating the lubricant supplier when the detected value of the parameter is deviated from the normal range.

Preferably, the lubricant supplier operates to discharge a predetermined quantity of the lubricant with every actuation. Further, the automatic lubricant supplying apparatus includes a distributor and a plurality of ducts, the distributor having an inlet port connected to the lubricant supplier and a plurality of outlet ports, the outlet ports of the distributor being connected individually to a plurality of parts of the machine working section through the ducts. Also, each duct is designed so that the quantity of lubricant supply through the duct is adjustable.

According to the present invention, as described above, it is determined whether or not the detected value of the parameter, which is indicative of the load acting on the motor, is deviated from the normal range of the motor load observed when the machine working section is properly lubricated, and the lubricant supplier is driven to supply the lubricant to the machine working section when the detected value of the parameter is deviated from the normal range. Therefore, the lubrication state of the machine working section can be quantitatively grasped, and the lubricant can be automatically timely supplied. Preferably, the lubricant supplier is connected to the plurality of parts of the machine working section individually through the distributor and the plurality of ducts, so that the lubricant can be properly supplied to the plurality of parts of the machine working section. Further, the predetermined quantity of the lubricant can be discharged from the lubricant supplier, and the quantity of lubricant supply through each duct is adjustable, so that the quantity of lubricant supply to the plurality of parts of the machine working section can be rationalized.

BEST MODE OF CARRYING OUT THE INVENTION

Figure 1:
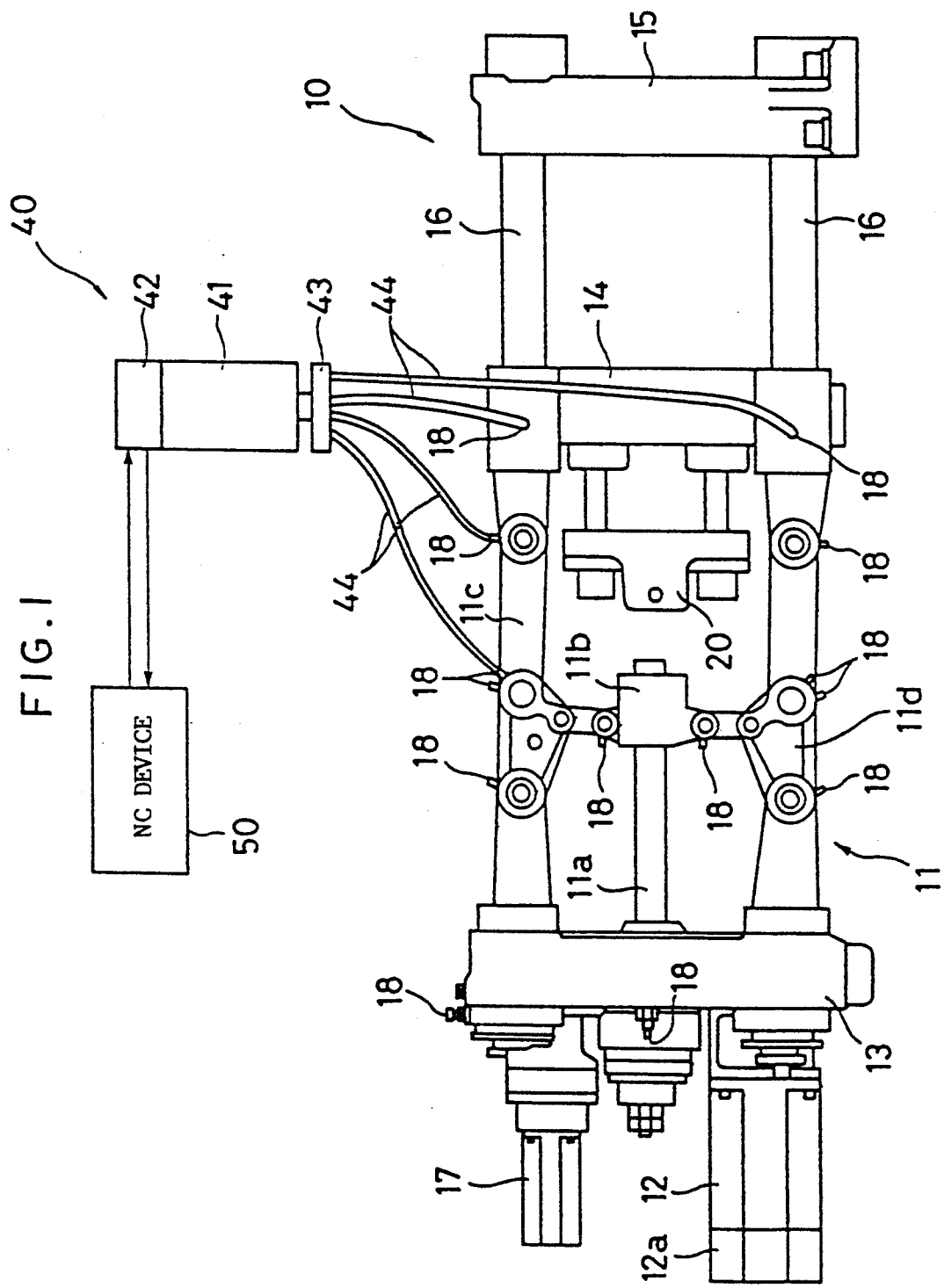
FIG. 1 is a schematic view showing part of an automatic lubricant supplying apparatus according to one embodiment of the present invention along with a mold clamping mechanism.
Figure 2:
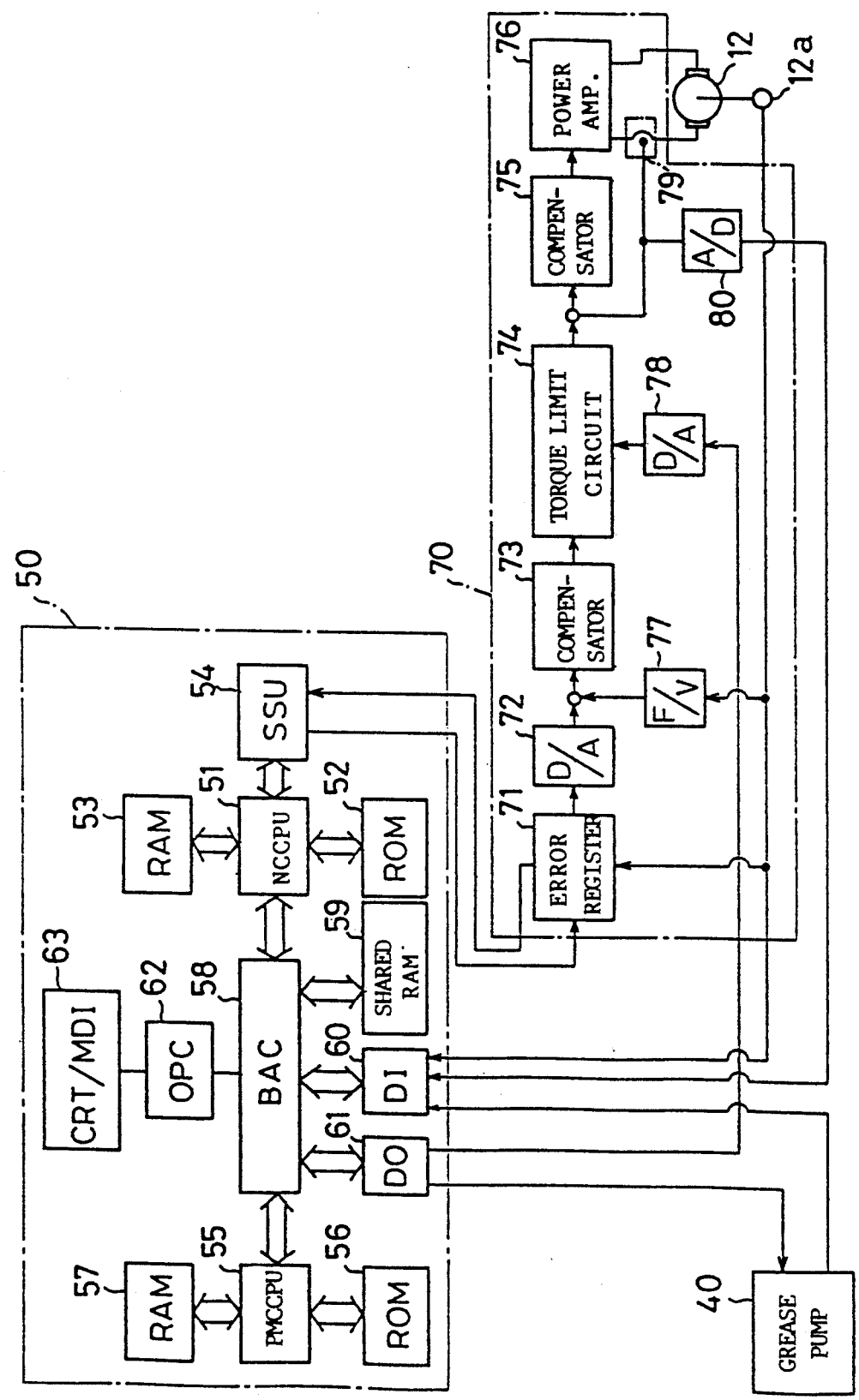
FIG. 2 is a block diagram showing a numerical control device and a servo circuit for a mold clamping axis.

Referring now to FIGS. 1 and 2, an automatic lubricant supplying apparatus according to one embodiment of the present invention mounted on, for example, an electric-powered injection molding machine will be described.

The lubricant supplying apparatus comprises a lubricant supplier 40 for supplying a lubricant to a mold clamping mechanism 10 of the injection molding machine, and a computer-contained numerical control device 50 with conventional functions for driving various working sections of the injection molding machine. The numerical control device 50 contains therein other circuit components than power amplifiers of servo circuits for various axes for driving servomotors (only a servomotor for a mold clamping axis is denoted by numeral 12) for the individual axes. For ease of description, however, the servo circuit 70 is shown independently of the control device 50, and only a servo circuit 70 corresponding to the mold clamping mechanism 10 is illustrated.

In the present embodiment, the mold clamping mechanism 10 is of a toggle type, comprising a toggle mechanism 11 which is formed of a ball screw 11a adapted to be rotated by the servomotor 12 fixed to a rear platen 13, through the medium of a transmission mechanism (not shown), a crosshead 11b having a ball nut (not shown) threadedly engaged with the ball screw 11a, and two groups of links 11c and 11d connected individually to the crosshead 11b. The toggle mechanism 11 is designed so that as the servomotor 12 rotates forwardly and reversely, the crosshead 11b reciprocates along the ball screw 11a to bend and extend the two link groups 11c and 11d, thereby causing a movable platen 14, which is connected to the toggle mechanism 11, to reciprocate along tie bars 16 which extend between a stationary platen 15 and the rear platen 13. Numeral 12a denotes a pulse encoder attached to the servomotor 12, and 17 and 20 denote a servomotor for mold thickness adjustment and an ejector, respectively.

In the present embodiment, the lubricant supplier 40 is composed of, for example, a piston pump (hereinafter referred to as grease pump) which uses grease as the lubricant. The grease pump 40 is provided with a cylinder 41 for storing the grease supplied from a source of grease supply (not shown), and a piston (not shown) is disposed in the cylinder 41 for reciprocation. Further, the grease pump 40 is provided with a pump drive section 42 for reciprocating the piston. The pump drive section 42 includes, for example, a crank mechanism (not shown) coupled to the piston, a motor (not shown) operatively connected to the crankshaft of the crank mechanism, and a motor driver circuit (not shown) adapted to start the motor in response to a grease supply start command from the numerical control device 50 and to stop the motor and deliver a grease supply end signal when one revolution of the motor or one stroke of reciprocation of the piston is detected by means of a detector (not shown). Thus, a predetermined quantity of grease from the cylinder 41, and the same quantity of grease from the grease supply source is then newly filled into the cylinder 41, while the one reciprocation of the piston is achieved by the motor rotation.

An inlet port (not shown) of a distributor 43 is connected to a discharge port (not shown) of the cylinder 41, and each of outlet ports (not shown) of the distributor 43 is connected, by means of tubes (some of which are disignated by numeral 44), to its corresponding one of grease nipples 18 which communicate with the respective outer ends of grease supply passages (not shown) formed individually in a plurality of regions of the mold clamping mechanism 10. The respective inner ends of the grease supply passages open to sliding surfaces between their corresponding sliding parts. More specifically, the respective inner ends of the grease supply passages open to sliding surfaces between the movable platen 14 and the tie bars 16, between the links and link pins, between the ball screw 11a, and the crosshead 11b, between the ball screw 11a and the rear platen 13, and between transmission mechanism components, etc. The inside diameter of each tube 34 is adjusted to a value corresponding to the required quantity of grease supply to regions to be greased.

The numerical control device 50 comprises a microprocessor (NCCPU) 51 for numerical control which is connected with a read-only memory (ROM) 52 loaded with a management program for generally controlling the injection molding machine and a random access memory (RAM) 53 for temporarily storing arithmetic data and the like, the CPU 51 being connected to the servo circuits for the individual axes through a servo interface (SSU) 54. Also, the control device 50 comprises a microprocessor (PMCCPU) 55 for a programmable machine controller (not shown), which process is connected with a ROM 56 stored with a sequence program and a RAM 57. A bus arbiter controller (BAC) 58 interposed between the two CPUs 51 and 54 is connected with a nonvolatile shared RAM 59 for storing a control program and various set values, input and output circuits 60 and 61, and an operator panel controller 62 connected with a manual data input device (CRT/MDI) with a CRT display unit.

The servo circuit 70 for the mold clamping axis includes an error register 71 which receives inputs command pulses supplied through the servo interface 54 from the NCCPU 51 and indicative of a command motor rotational position, and feedback pulses supplied from the pulse encoder 12a and indicative of an actual motor rotational position. The output of the error register 71, which is indicative of a positional deviation, is converted into a voltage indicative of a command motor speed in a digital-to-analog (D/A) converter 72. Further, the circuit 70 includes a frequency-to-voltage (F/V) converter 77 for converting the frequency of the feedback pulses into a voltage indicative of an actual motor speed, a compensator 73 for amplifying the difference between the respective output voltages of the two converters 72 and 77, which is indicative of a speed deviation, and generating an output voltage indicative of a command motor driving current, and a torque limit circuit 74 for restricting the output voltage of the compensator 73 to a level lower than a voltage corresponding to a torque limit value delivered from the PMCCPU 55 through the output circuit 61 and a D/A converter 78. Furthermore, the servo circuit 70 includes a compensator 75 for amplifying the difference between the output voltage of the torque limit circuit 74 and the output voltage of a current detector 79 indicative of an actual motor driving current flowing through the armature of the servomotor 12, and a power amplifier 76 for driving the servomotor 12 in response to the output voltage of the compensator 75.

The input circuit 60 of the numerical control device 50 is connected to an A/D converter 80, which is connected to the current detector 79, and a motor drive section of the grease pump 40, and the output circuit 61 is connected to the motor drive section of the pump 40. As a result, the numerical control device 50 is enabled to receive the pulse encoder output indicative of the actual motor rotational position, the current detector output indicative of the actual motor driving current, and the grease supply end signal from the grease pump 40, and to deliver the grease supply start signal to the grease pump 40.

The following is a description of the operation of the automatic lubricant supplying apparatus.

If the quantity of grease supply to the mold clamping mechanism 10 is insufficient, sliding resistances, which are produced between the various sliding parts of the mold clamping mechanism 10, e.g., between the movable platen 14 and the tie bars 16 or between the links, increase when the mold clamping mechanism 10 is actuated. Accordingly, the load acting on the servomotor 12 for mold clamping increases, so that the motor driving current increases. Thereupon, an operator previously decides, experimentally for example, the quantity of increase of the motor driving current during the process in which the mold clamping mechanism 10 shifts from a proper lubrication state to an improper lubrication state, in order that the aforesaid phenomenon can be quantitatively grasped and that a grease supplying process (mentioned later) can be executed. Even when injection molding machines of the same type are operated under the same molding conditions by using the same grease, the aforesaid increase of the driving current is decided for each type of injection molding machine, each molding condition, and each type of grease, and on the basis of a motor current measured every time a specific moved position (e.g., moved position of the movable platen just short of the mold touch position) is reached by the movable platen 14, since the motor driving current varies in dependence on the moved position of the movable platen 14 during mold closing, mold clamping, and mold opening processes. The motor current increase (preferably, a quantity a little smaller than this) decided in this manner is loaded as a file into the shared RAM 59 for each combination of the type of the injection molding machine, the molding conditions, and the type of the grease. The specific moved position of the movable platen is also loaded into the shared RAM 59.

Before starting an injection molding cycle by means of the injection molding machine, the operator enters the type of the injection molding machine, the molding conditions, the type of the grease, and the specific moved position of the movable platen 14 (in other words, moved position of the movable platen 14 by which the lubrication state of the mold clamping mechanism 10 is to be discriminated) at the time of motor current measurement for deciding the increase of the motor current during the process in which the mold clamping mechanism 10 shifts from the proper lubrication state to the improper lubrication state as inputs into the numerical control device 50 through the CRT/MDI 63. Under the control of the PMCCPU 55 which responds to this data entry, the increase of the motor driving current corresponding to the combination of the type of the injection molding machine, the molding conditions, and the type of the grease is read out from the file in the shared RAM 59, and is loaded together with the specific moved position of the movable platen 14 into a predetermined memory region of the shared RAM 59.

Then, after ascertaining that the working sections for the individual axes of the injection molding machine are in the proper lubrication state, the operator causes the injection molding cycle to start. Under the control of the numerical control device 50, the injection molding machine executes a normal injection molding cycle. During the execution of a first molding cycle, for example, the PMCCPU 55 determines whether or not the specific moved position is reached by the movable platen 14 with reference to a stored value in a present value register in the shared RAM 59, which is updated in response to the feedback pulses from the pulse encoder 12a and is indicative of an actual moved position of the movable platen 14 (actual rotational position of the mold clamping servomotor). If it is concluded that the specific moved position is reached, the PMCCPU 55 reads the output of the current detector 79, which is indicative of the actual motor driving current for the present point of time, through the A/D converter 80 and the input circuit 60, adds the aforesaid motor current increase to the normal actual motor current value thus read, thereby obtaining the actual motor current value (upper limit value of the range of the normal motor current) for the point of time when the lubrication state of the mold clamping mechanism 10 starts to become improper, and loads the resulting value as a reference motor current into the shared RAM 59.

Figure 3:
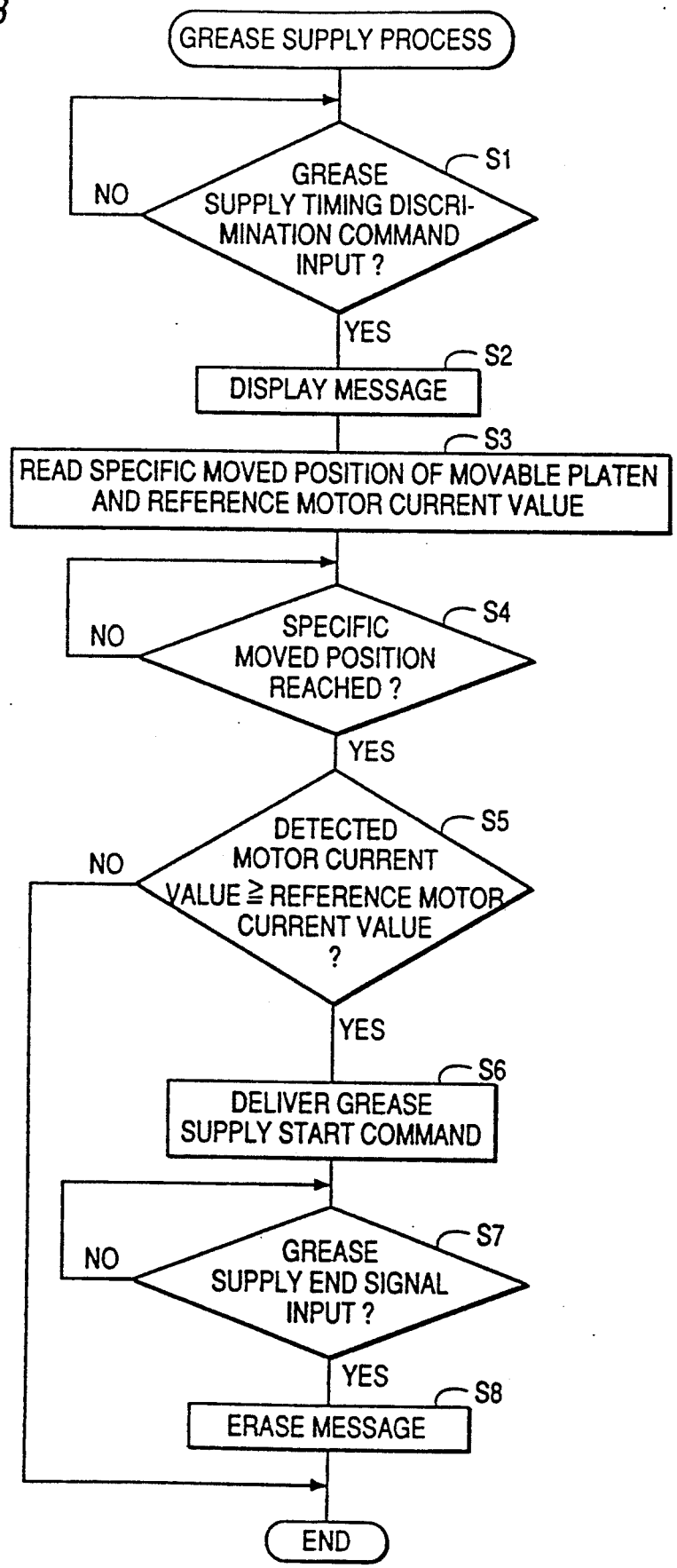
FIG. 3 is a flow chart showing a grease supply process executed by means of the numerical control device.

In an injection molding cycle executed after the loading of the reference motor current value, the PMCCPU 55, which functions as control means for the automatic lubricant supplying apparatus and as sequence control means associated with the injection molding cycle, executes the grease supplying process of FIG. 3 concurrently with a conventional sequence control process.

In the process of FIG. 3, the PMCCPU 55 first determines whether or not a grease supply timing discrimination command is manually entered through the CRT/MDI 63 (Step S1). If no discrimination command is entered, the PMCCPU 55 is held on stand-by until this command is entered. If it is concluded that the discrimination command is inputted, on the other hand, the PMCCPU 55 causes a message "GREASE SUPPLY TIMING BEING DISCRIMINATED" to be displayed on a CRT screen of the CRT/MDI 63 (Step S2). Then, the reference motor current value and the specific moved position of the movable platen previously loaded in the shared RAM 59 are read out therefrom and stored in the RAM 57 (Step S3), and a determination is made as to whether or not the specific moved position is reached by the movable platen 14 with reference to the stored value in the present value register, which is indicative of the actual moved position of the movable platen 14 (Step S4). If the specific moved position is not reached by the movable platen 14 yet, the PMCCPU 55 is held on stand-by until the specific moved position is reached.

If it is concluded that the specific moved position is reached by the movable platen 14, the PMCCPU 55 reads the output of the current detector 79, which is indicative of the actual motor driving current at that time, and determines whether or not the detected value of the motor current is not smaller than the reference value (Step S5). If it is concluded that the detected motor current value is smaller than the reference value, that is, the clamping mechanism 10 is being properly lubricated, the process of FIG. 3 is finished without actuating the grease pump 40. If it is concluded in Step S5 that the detected motor current value is not smaller than the reference value, that is, the lubrication of the mold clamping mechanism 10 is improper, the PMCCPU 55 delivers the grease supply start command to the motor drive section of the grease pump 40 (Step S6).

In response to the grease supply start command, the motor drive section starts the motor of the grease pump 40. As the motor rotates, the piston in the cylinder 41 of the pump 40 advances. While the motor makes a half turn so that the piston advances over a predetermined stroke, the grease is supplied to a predetermined quantity from the cylinder 41 to the distributor 43. The grease is supplied to a plurality of parts of the mold clamping mechanism 10 through the tubes 44 which are connected individually to the outlet ports of the distributor 43. The inner diameter of each tube 44 is set so that the quantity of grease supply through each tube is adjusted to a required value, so that the state of lubrication at every part can be rationalized without excessive or insufficient grease supply to any part.

Thereafter, the piston retreats as the motor rotates. When the motor makes a half turn in the direction to retreat the piston, one motor revolution is detected by means of the built-in detector in the motor drive section, and the grease supply end signal is generated. In response to this end signal, the motor drive section stops the motor rotation. As a result, the piston retreats over the predetermined stroke and returns to its original moved position. While the piston is retreating in this manner, the grease is newly supplied to the same quantity as the grease discharged from the cylinder 41 as the piston advances, from the grease supply source to the cylinder.

In the meantime, the PMCCPU 55 monitors the entry of the grease supply end signal from the grease pump 40 (Step S7), and cancels the display of the message on the CRT screen in response to the entry of this end signal (Step S8), whereupon the grease supply process of FIG. 3 ends.

The present invention is not limited to the embodiment described above, and various modifications may be effected therein.

According to the above embodiment, for example, the present invention is applied to the mold clamping mechanism of the injection molding machine. However, the present invention may be applied to various other machines which have a working section driven by means of a motor, and also to other working sections of the injection molding machine. According to the present invention, moreover, the lubricant may be automatically supplied to a plurality of working sections of the machine. Preferably, in this case, the timing for lubricant supply is discriminated for each machine working section, and a lubricant supplier is provided for each machine working section. In the embodiment described above, the tubes individually having the required inner diameters are used in order to rationalize the quantity of grease supply to a plurality of parts of the mold clamping mechanism. Alternatively, however, the tubes may be provided individually with valves so that the respective openings of the valves can be adjusted individually. In the above embodiment, moreover, the grease supply timing discrimination command is manually entered. Alternatively, however, this command may be previously described in the control program so that the grease supply process can be automatically executed every time this command is read or with every predetermined number of injection molding cycles, for example.

We claim:

1. A method for supplying a lubricant to a working section of a motor-driven machine by means of a lubricant supplier operable to supply lubricant to said section when operated, said method comprising the steps of:

(a) measuring the level of a load acting on the motor of the machine;
(b) comparing the measured level of said load with levels in a normal range of motor load levels occurring when said machine working section is properly lubricated; and
(c) supplying lubricant to said working section by causing said lubricant supplier to operate when the measured level of said load is deviated from said normal range.

2. An automatic lubricant supplying method according to claim 1, wherein said load is measured as a function of the driving current of said motor.

3. A lubricant supplying apparatus for use in a motor-driven machine having a working section, said apparatus comprising:

a lubricant supplier operable for supplying a lubricant to said machine working section;
measuring means for measuring the level of a load acting on the motor of said machine;
memory means for storing a normal range of motor load levels occurring when said machine working section is properly lubricated; and
control means for comparing the measured load level with levels of said normal range thereof and causing said lubricant supplier to operate to supply lubricant to said working section when the measured level of said load is deviated from said normal range.

4. An automatic lubricant supplying apparatus according to claim 3, wherein said measuring means measures a driving current of said motor as a function of the load level acting on the motor.

5. An automatic lubricant supplying apparatus according to claim 3, wherein said machine is an injection molding machine and wherein said working section thereof is driven by means of a servomotor.

6. An automatic lubricant supplying apparatus according to claim 3, wherein said lubricant supplier is operable to discharge a predetermined quantity of said lubricant each time said control means causes it to supply lubricant to said working section.

7. An automatic lubricant supplying apparatus according to claim 3, wherein said working section has a plurality of working parts and said apparatus further includes a distributor having an inlet port connected to said lubricant supplier and a plurality of outlet ports, each said outlet port being connected individually to a respective one of said working parts.

8. An automatic lubricant supplying apparatus according to claim 7, wherein each said port includes a duct designed so that the quantity of lubricant supply therethrough is adjustable.

9. An automatic lubricant supplying apparatus according to claim 8, wherein each said duct has an inner diameter selected to permit the required flow of lubricant therethrough.

* * * * *

UNITED STATES PATENT AND TRADEMARK OFFICE
CERTIFICATE OF CORRECTION

PATENT NO. : 5,217,662

DATED : June 8, 1993

INVENTOR(S) : MASATO YAMAMURA, NISHIMURA KOICHI and SATO TAKASHI

It is certified that error appears in the above-identified patent and that said Letters Patent is hereby corrected as shown below:

Column 1, line 54, "moter" should be --motor--.

Column 3, line 45, after "grease" insert --is discharged--;

line 53, "disignated" should be --designated--.

Signed and Sealed this

Twenty-second Day of March, 1994

*Attest:*

BRUCE LEHMAN

*Attesting Officer*    *Commissioner of Patents and Trademarks*